H. Hubble,
Steam-Boiler Flasher.
Nº 876. Patented Aug. 6, 1838.
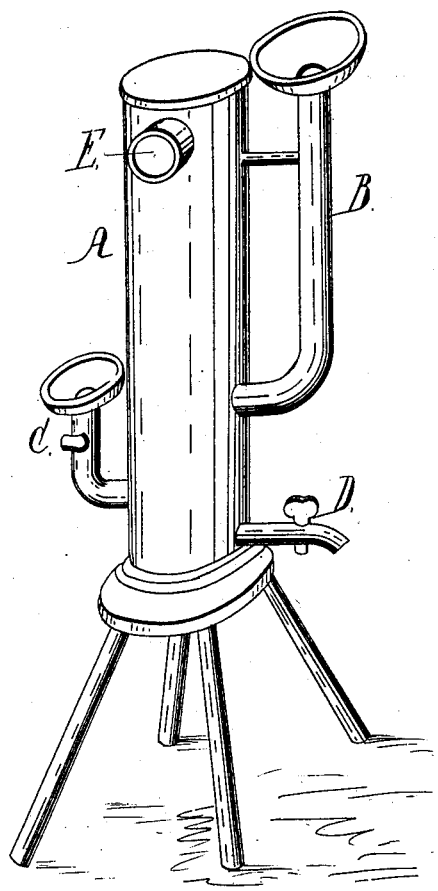

UNITED STATES PATENT OFFICE.

HORATIO HUBBELL, OF PHILADELPHIA, PENNSYLVANIA.

MODE OF GENERATING STEAM.

Specification of Letters Patent No. 876, dated August 6, 1838.

*To all whom it may concern:*

Be it known that I, HORATIO HUBBELL, of the city and county of Philadelphia and State of Pennsylvania, have invented a new and useful Improvement in Steam-Engines; and I do hereby declare that the following is a full and exact description.

The nature of my improvement or invention consists in applying to the steam engine a mode of instantaneously generating steam by bringing water of the common temperature in contact with hot or boiling oil or hot or boiling grease—the steam so generated to be used and applied as the moving power or agent of the steam engine. The words "common temperature" are used as aforesaid because water of that temperature is the kind proposed to be used, is fully adequate to the effect designed and is the most economical—but at the same time the effect can be produced as long as the water is inferior in temperature to oil—the oil being heated above the boiling point of water or up to that point. The boiling point of oil or grease being above that of water or vice versa that of water being below that of oil or grease, by bringing water in contact with oil or grease heated above the boiling point of water steam is instantaneously generated. The point at which the oil or grease is intended to be kept heated is at or near the boiling point of oil, since the hotter the oil the more rapid and complete the action upon the water.

The oil—whale oil is perhaps most convenient and best—is to be introduced into copper, brass or other suitable steam tight metallic cylinders, boilers, generators, or vessels. The quantity of oil to be introduced is to be regulated by the capacity of the cylinders, etc., the bottom of which it ought to cover to some depth so as to have a good body of oil—generally filling about a fourth of the cylinder, &c., will be sufficient—though there may be more. The oil may be introduced into the cylinders, &c., by means of a stop cock with a funnel head the cock being placed or inserted at the side of the cylinders so as to be on a level with the upper surface of the oil when introduced. The oil so introduced having been heated above the boiling point of water by a fire conveniently applied to said cylinder, boiler, generator, or other suitable vessel (whichever may be adopted), the water from the reservoir is then to be let in by a pipe or pipes into the said cylinder boiler, generator, or other suitable vessel so as to gradually fall upon the surface of the oil or so as to come in contact with the oil at or beneath its surface. The reservoir here spoken of is intended in general to be a large basin placed on a level with the top of the cylinder, &c., the pipe passing from the basin to the cylinder. The said pipe or pipes to let the water into the cylinder are to be provided with one or more valves shutting outward so as to prevent the steam after it is generated from escaping through them; while by opening inward they admit the water. The bore or caliber of the pipe or pipes may be made so contracted and may be so calculated as to let the water into the oil continuously but very slowly and gradually or the pipe being more free in its bore may have its water let into the oil or shut out by means of a cock constructed so as to open and shut at alternate intervals by means of an eccentric and the working of the engine, or the said pipe or pipes may be connected with the pumps such as are now used to force the water into common boilers, but still care must be taken so to construct them as to introduce the water gradually and by measure to the hot or boiling oil—as is done in the former cases. The quantity of water to be let into the hot or boiling oil is to be regulated by the quantity of oil employed and the extent of its surface, and the necessity of generating a greater or less quantity of steam care being always taken not to drown the oil by throwing in too profuse a quantity of water upon the oil and thereby produce a dangerous explosion. The pipes aforesaid may pass directly through the sides of the cylinders &c., to the oil or entering at the top may be carried down from the top of the cylinder, &c., along the inside of the cylinder until it reaches the oil. The heat of the oil in the cylinder may be ascertained and regulated by the application of the thermometer to a hollow bulbed or funnel headed stop cock inserted in the side of the generating vessel so as to let a quantity of the heated oil pass out at any time into the funnel head; this cock may be also used for introducing the oil. The oil may be drawn off from the generating vessel by means of a stop cock inserted at the bottom. As the steam is thus generated it is applied to and let off from a piston working in a steam tight cylinder by means of the sliding valve worked by an eccentric as is now done in high pressure steam engines.

The words "common temperature" are here used with the saving explanation as before given.

As a particular application of the above described improvement or invention, the annexed explanation of the accompanying drawing is given.

A, a steam tight metallic cylinder; B, basin and pipe to let the water into the cylinder upon the hot or boiling oil; C, funnel headed stock cock to let the oil out to be measured by the thermometer and also to introduce oil into the cylinder; D, stop cock to draw off the oil; E, pipe to let the steam generated pass to the piston cylinder.

In the foregoing specification I claim as my own invention and discovery—

The application to the steam engine of the mode of instantaneously generating steam by bringing water of the common temperature in contact with hot or boiling oil or hot or boiling grease.

HORATIO HUBBELL.

Witnesses:
CASPER MOFFIT,
JOHN UPHAM.